United States Patent
Hu

(10) Patent No.: US 10,764,023 B2
(45) Date of Patent: Sep. 1, 2020

(54) COMMUNICATION METHOD AND COMMUNICATION APPARATUS

(71) Applicant: BOE TECHNOLOGY GROUP CO., LTD., Beijing (CN)

(72) Inventor: Kejun Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/109,471

(22) Filed: Aug. 22, 2018

(65) Prior Publication Data

US 2019/0288827 A1    Sep. 19, 2019

(30) Foreign Application Priority Data

Mar. 16, 2018   (CN) .......................... 2018 1 0218667

(51) Int. Cl.
| | |
|---|---|
| *H04L 5/14* | (2006.01) |
| *H04L 5/00* | (2006.01) |
| *H04B 1/713* | (2011.01) |
| *H04W 24/08* | (2009.01) |
| *H04W 72/00* | (2009.01) |
| *H04W 72/04* | (2009.01) |
| *H04W 72/12* | (2009.01) |
| *H04W 84/20* | (2009.01) |
| *H04W 4/08* | (2009.01) |
| *H04W 76/40* | (2018.01) |
| *H04W 72/08* | (2009.01) |
| *H04W 4/06* | (2009.01) |

(52) U.S. Cl.
CPC .......... *H04L 5/1469* (2013.01); *H04L 5/0012* (2013.01); *H04W 4/06* (2013.01); *H04W 24/08* (2013.01); *H04W 72/005* (2013.01); *H04W 72/0453* (2013.01); *H04W 72/121* (2013.01); *H04W 84/20* (2013.01)

(58) Field of Classification Search
CPC .. H04L 5/1469; H04L 5/0012; H04W 72/121; H04W 72/0453; H04W 72/005; H04W 24/08; H04W 4/06; H04W 84/20; H04W 72/0446; H04W 76/40; H04W 72/1247; H04W 72/10; H04W 72/085; H04W 4/08
See application file for complete search history.

(56) References Cited

U.S. PATENT DOCUMENTS

| | | | | |
|---|---|---|---|---|
| 5,528,622 A | * | 6/1996 | Cadd ...................... | H04B 1/715 370/447 |
| 2008/0028450 A1 | * | 1/2008 | Zhao ...................... | H04W 4/08 726/6 |

(Continued)

*Primary Examiner* — Andrew Lai
*Assistant Examiner* — Harry H Kim
(74) *Attorney, Agent, or Firm* — Kinney & Lange, P.A.

(57) ABSTRACT

A communication method, a communication apparatus, and a non-transitory computer readable storage medium storing a computer program are disclosed. In the communication method, a plurality of predetermined frequency points are monitored to determine whether a target group has been established. In response to no target group being established, a target group is established; and from a plurality of transmission time slots for the target group, a first transmission time slot is determined for a terminal device. Then, the terminal device transmits a data message in the first transmission time slot.

14 Claims, 6 Drawing Sheets

(56) References Cited

U.S. PATENT DOCUMENTS

| | | | |
|---|---|---|---|
| 2015/0043541 A1* | 2/2015 | Blankenship | H04W 56/002 |
| | | | 370/336 |
| 2016/0234650 A1* | 8/2016 | Kats | H04W 16/18 |
| 2016/0360548 A1* | 12/2016 | Nguyen | H04W 4/08 |
| 2017/0055104 A1* | 2/2017 | Wegelin | H04W 72/0486 |
| 2017/0094602 A1* | 3/2017 | Dinh | H04W 72/1247 |

* cited by examiner

COMMUNICATION METHOD AND COMMUNICATION APPARATUS

CROSS-REFERENCE TO RELATED APPLICATION(S)

The present application claims priority to Chinese Patent Application No. 201810218667.7 entitled "COMMUNICATION METHOD AND COMMUNICATION APPARATUS" and filed on Mar. 16, 2018, which is incorporated herein by reference in its entirety.

TECHNICAL FIELD

The present disclosure relates to the field of communications, and in particular, to a communication method and a communication apparatus.

BACKGROUND

Related wireless voice communications are mostly performed on ISM open frequency bands, such as 433 MHz, 915 MHz, and 2.4 GHz. Since the 433 MHz and 915 MHz frequency bands have lower frequencies and narrower available bandwidths (tens of kHz), it is neither suitable for carrying and transmitting high-bandwidth data in these bands (e.g., for chips operating in the 433 MHz frequency band, a data rate of its physical layer is no higher than 500 kbps), nor suitable for full-duplex communication. For example, a walkie-talkie operating in the 433 MHz band uses half-duplex voice communication. In contrast, the high frequency bands, such as the 2.4 GHz frequency band, have significant advantages in terms of available bandwidth (tens of MHz) and carrier frequency. In these frequency bands, an over-the-air transmission time of a signal is short, and in theory, there may be a higher data transmission rate (e.g., for a chip operating in the 2.4 GHz frequency band, the data transmission rate of its physical layer may support a rate up to 2 Mbps). However, the existing 2.4 GHz low-power-consumption communication technologies (e.g., Bluetooth, Zigbee, etc.) usually cannot be used in applications (e.g., remote control, one-way Bluetooth headset, speaker, etc.) with higher communication rate requirements due to protocol overhead and power consumption restrictions. In addition, there are few full-duplex applications in the 2.4 GHz frequency band.

SUMMARY

Embodiments described herein provide a communication method, a communication apparatus, and a non-transitory computer readable storage medium storing a computer program.

According to a first aspect of the present disclosure, a communication method is provided. In the communication method, a plurality of predetermined frequency points are monitored to determine whether a target group has been established. A target group is established in response to no target group being established. Further, from a plurality of transmission time slots for the target group, a first transmission time slot is determined for the terminal device. Then, the terminal device transmits a data message in the first transmission time slot.

In an embodiment of the present disclosure, the communication method further includes: the terminal device joining the target group in response to the target group being established.

In an embodiment of the present disclosure, in the step of establishing the target group, a target frequency point for the target group is determined, and a first group message is transmitted at the target frequency point. The first group message includes indication information and a first parameter. The indication information is related to the target group. The first parameter is related to the first transmission time slot. Then, a second group message is received from at least one second terminal device. The second group message includes the indication information and a second parameter. The second parameter is related to each second transmission time slot for the at least one second terminal device.

In an embodiment of the present disclosure, in the step of determining the target frequency point for the target group, one of the plurality of predetermined frequency points that is not occupied is determined as the target frequency point.

In an embodiment of the present disclosure, in the step of determining, from the plurality of transmission time slots for the target group, the first transmission time slot for the terminal device, the first parameter and the second parameter are compared. Then, a transmission priority of the terminal device in the target group is determined according to a result of the comparison. Next, the first transmission time slot is determined based on the transmission priority.

In an embodiment of the present disclosure, the indication information includes an identification of the target group.

In an embodiment of the present disclosure, the indication information includes a device address of a terminal device belonging to the target group.

In an embodiment of the present disclosure, the first parameter and the second parameter are random numbers.

In an embodiment of the present disclosure, in the step of the terminal device joining the target group in response to the target group being established, it is determined whether a number of terminal devices that have joined the target group exceeds a number of terminal devices that can be accommodated in the target group. The terminal device joins the target group, in response to the number of terminal devices that have joined the target group not exceeding the number of terminal devices that can be accommodated in the target group.

In an embodiment of the present disclosure, in the step of determining, from the plurality of transmission time slots for the target group, the first transmission time slot for the terminal device, a first group message is transmitted at the target frequency point for the target group within a predetermined time. The first group message includes indication information and a first parameter. The indication information is related to the target group. The first parameter is related to the first transmission time slot. In response to receiving the second group message from the at least one second terminal device within a predetermined time period, the first transmission time slot is determined according to the first parameter, the second parameter, and the number of terminal devices that have joined the target group. The second group message includes the indication information and a second parameter. The second parameter is related to each second transmission time slot for the at least one second terminal device. In response to the second group message not being received within the predetermined time period, the first transmission time slot is determined according to the number of terminal devices that have joined the target group.

In an embodiment of the present disclosure, the communication method further includes: determining a master device in the target group.

In an embodiment of the present disclosure, in the communication method, in response to determining that the master device is the terminal device, the terminal device calculates a group communication success rate according to the data message transmitted and received in the target group. The data message includes a third parameter. The third parameter indicates a number of successful data receptions. In response to the group communication success rate being lower than a threshold, the terminal device transmits a frequency hopping message in the target group. The frequency hopping message includes a frequency hopping frequency point. Then, the terminal device receives a frequency hopping response message from other terminal devices in the target group. In response to the terminal device receiving the frequency hopping response message from all other terminal devices in the target group, the terminal device stops transmitting the frequency hopping message, and switches to the frequency hopping frequency point.

In an embodiment of the present disclosure, further, in the communication method, in response to determining that the master device is not the terminal device, the terminal device receives a frequency hopping message from the master device indicating a frequency hopping frequency point. Then, the terminal device transmits a frequency hopping response message and switches to the frequency hopping frequency point.

In an embodiment of the present disclosure, in the communication method, in response to determining that the master device is not the terminal device, the terminal device re-times transmission of the data message based on a reception time of a data message from the master device, a transmission time of the data message, and the first transmission time slot.

In an embodiment of the present disclosure, the number N of terminal devices that can be accommodated by the target group is calculated as:

$$N = \frac{T_s}{\frac{d}{c} + \frac{b_A * T_s}{b_P}}.$$

Here, Ts represents a length of the plurality of transmission time slots for the target group, d represents a communication distance, c represents a speed of light, $b_A$ represents a data encoding rate, and $b_P$ represents a data transmission rate.

According to a second aspect of the present disclosure, a communication apparatus is provided. The communication apparatus includes at least one processor and at least one memory storing computer program. When the computer program is executed by the at least one processor, the communication apparatus is caused to monitor a plurality of predetermined frequency points to determine whether a target group has been established. In response to no target group being established, a target group is established; and from a plurality of transmission time slots for the target group, a first transmission time slot is determined for a terminal device. Then, a data message is transmitted in the first transmission time slot.

In an embodiment of the present disclosure, the computer program, when executed by the at least one processor, further causes the communication apparatus to enable the terminal device to join the target group in response to the target group being established.

In an embodiment of the present disclosure, the computer program, when executed by the at least one processor, causes the communication apparatus to establish the target group by: determining a target frequency point for the target group; transmitting a first group message at the target frequency point, wherein the first group message includes indication information and a first parameter, wherein the indication information is related to the target group, and the first parameter is related to the first transmission time slot; and receiving a second group message from at least one second terminal device, wherein the second group message includes the indication information and a second parameter, wherein the second parameter is related to each second transmission time slot for the at least one second terminal device.

In an embodiment of the present disclosure, the computer program, when executed by the at least one processor, causes the communication apparatus to determine a target frequency point for the target group by determining one of the plurality of predetermined frequency points that is not occupied as the target frequency point.

In an embodiment of the present disclosure, the computer program, when executed by the at least one processor, causes the communication apparatus to determine, from the plurality of transmission time slots for the target group, the first transmission time slot for the terminal device by: comparing the first parameter with the second parameter; determining, according to a result of the comparison, a transmission priority of the terminal device in the target group; and determining the first transmission time slot based on the transmission priority.

In an embodiment of the present disclosure, the computer program, when executed by the at least one processor, causes the communication apparatus to enable the terminal device to join the target group by: determining whether a number of terminal devices that have joined the target group exceeds a number of terminal devices that can be accommodated by the target group; and enabling the terminal device to join the target group, in response to the number of terminal devices that have joined the target group does not exceed the number of terminal devices that can be accommodated by the terminal device.

In an embodiment of the present disclosure, the computer program, when executed by the at least one processor, causes the communication apparatus to determine, from the plurality of transmission time slots for the target group, the first transmission time slot for the terminal device by: transmitting, at a target frequency point for the target group, a first group message within a predetermined time period, wherein the first group message includes indication information and a first parameter, wherein the indication information is related to the target group, and the first parameter is related to the first transmission time slot; and in response to receiving a second group message from at least one second terminal device within the predetermined time period, wherein the second group message includes the indication information and a second parameter, wherein the second parameter is related to each second transmission time slot of the at least one second terminal device, determining the first transmission time slot according to the first parameter, the second parameter and the number of terminal devices that have joined the target group; and in response to not receiving the second group message within the predetermined time period, determining the first transmission time slot according to the number of terminal devices that have joined the target group.

In an embodiment of the present disclosure, the computer program, when executed by the at least one processor, further causes the communication apparatus to determine a master device in a target group.

In an embodiment of the present disclosure, the computer program, when executed by the at least one processor, causes the communication apparatus to enable the terminal device to calculate a group communication success rate according to the data message transmitted and received in the target group, in response to determining that the master device is the terminal device, wherein the data message includes a third parameter, wherein the third parameter indicates a number of successful data receptions; enable the terminal device to transmit a frequency hopping message in the target group, in response to the group communication success rate being lower than a threshold, wherein the frequency hopping message includes a frequency hopping frequency point; enable the terminal device to receive a frequency hopping response message from other terminal devices in the target group; and enables the terminal device to stop transmitting the frequency hopping message and switch to the frequency hopping point in response to the terminal device receiving the frequency hopping response message of all other terminal devices in the target group.

In an embodiment of the present disclosure, the computer program, when executed by the at least one processor, causes the communication apparatus to enable the terminal device to receive a frequency hopping message from the master device indicating the frequency hopping point, in response to determining that the master device is not the terminal device; enable the terminal device to transmit a frequency hopping response message; and enable the terminal device to switch to the frequency hopping frequency point.

In an embodiment of the present disclosure, the computer program, when executed by the at least one processor, causes the communication apparatus to enable the terminal device to re-time transmission of the data message, based on a reception time of a data message from the master device, a transmission time of the data message and the first transmission time slot, in response to determining that the master device is not the terminal device.

According to a third aspect of the present disclosure, a non-transitory computer readable storage medium storing a computer program is provided, wherein the computer program, when executed by a processor, performs the steps of the communication method as described above.

DETAILED DESCRIPTION

The technical solutions of the embodiments of the present disclosure will be clearly and completely described below in conjunction with the accompanying drawings, in order to make objects, technical solutions and advantages of the embodiments of the present disclosure more clear. Obviously, the described embodiments are part of, but not all of, the embodiments of the present disclosure. All other embodiments which may be obtained by those skilled in the art based on the embodiments of the present disclosure without creative labor shall fall within the protective scope of the present disclosure.

All terms (including technical and scientific terms) used herein have the same meaning as commonly understood by those skilled in the art, unless otherwise defined. It is further understood that terms such as those defined in commonly used dictionaries should be interpreted as having the meanings consistent with their meanings in the context of the specification and related art, and will not be interpreted in an idealized or overly formal form, unless otherwise clearly defined herein.

An embodiment of the present disclosure provides a communication method. The communication method enables full-duplex wireless communication between a plurality of terminal devices in a group. In the communication method, one transmission time slot is respectively designated for each of a plurality of terminal devices in a group. Each terminal device transmits a message in its respective time slot, and receives a message in other time slots, thereby enabling time division multiplexing (TDD) of the plurality of terminal devices. This can avoid collision of the messages transmitted by different terminal devices, thereby achieving full-duplex wireless communication.

Figure 1:
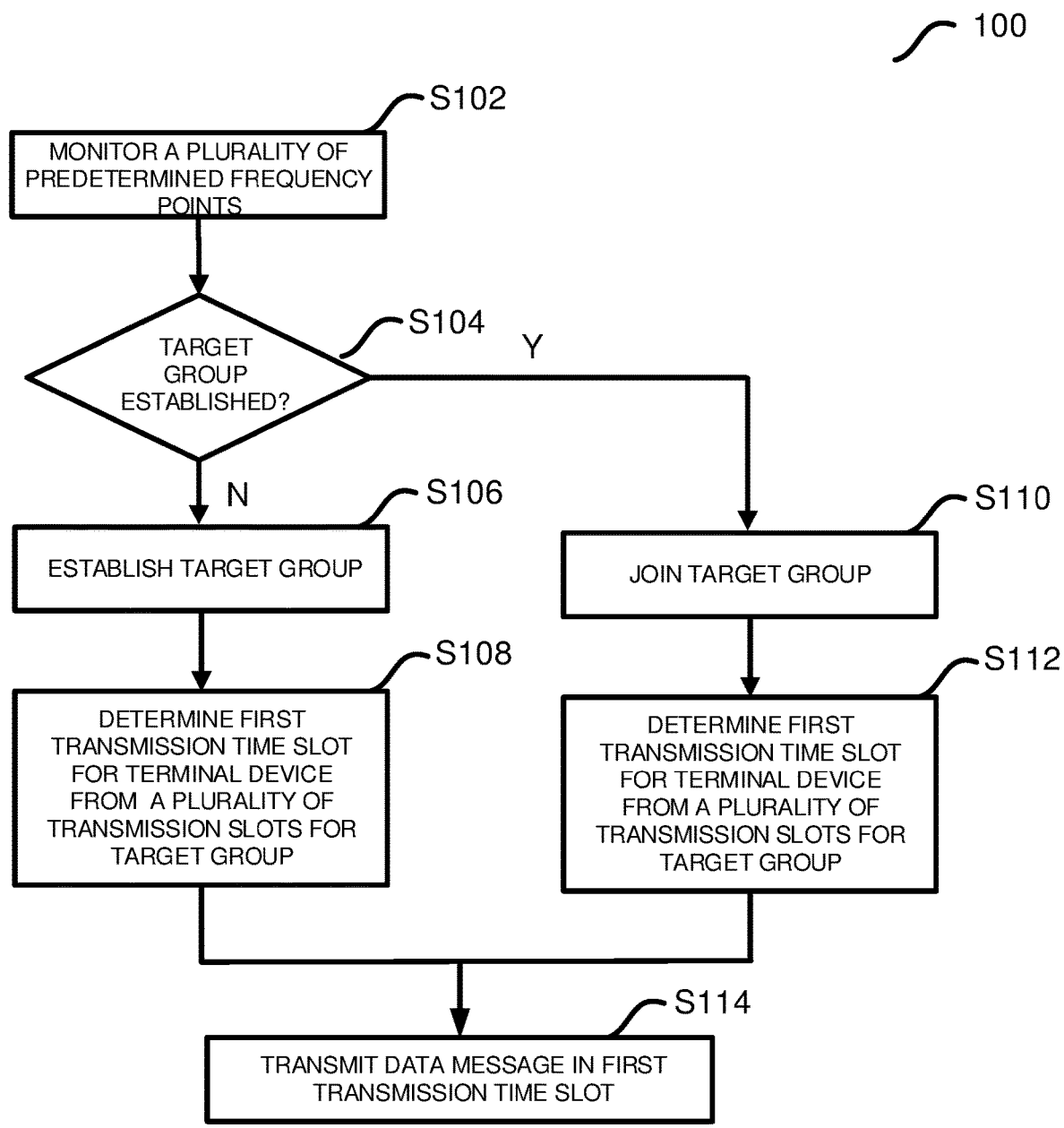
FIG. 1 is an exemplary flowchart of a communication method in accordance with an embodiment of the present disclosure.

FIG. 1 shows an exemplary flowchart of a communication method 100 in accordance with an embodiment of the present disclosure. The communication method 100 may be performed, e.g., on a terminal device. The terminal device is, e.g., a walkie-talkie, a mobile phone, a smart terminal or other devices having a communication function.

In the communication method, the terminal device desires to communicate with other terminal devices in a specific group (hereinafter referred to as "target group"). In step S102, the terminal device (hereinafter referred to as "first terminal device") monitors a plurality of predetermined frequency points in a predetermined frequency band (e.g., a 2.4 GHz frequency band) to determine whether a target group has been established. There are typically up to 125 frequency points available in the 2.4 GHz frequency band. In order to reduce the time it takes to scan all the frequency points, only a specified number of frequency points, such as 16 frequency points, may be limited in the embodiment of the present disclosure. The first terminal device alternately monitors at all the frequency points in the predetermined frequency band to determine whether a target group has been established. In some embodiments, a monitoring time at each frequency point is, e.g., 50 ms. Here, monitoring includes receiving a message at a predetermined frequency point, and determining whether the message is related to a target group.

In step S104, the first terminal device determines whether a target group has been established. In one example, it may be determined whether a target group has been established based on the received message related to the target group. The message related to the target group may include a group message related to the target group and a data message related to the target group. The group message may include indication information related to the target group. The data message may also include indication information related to the target group. The indication information may include an identification of the target group, such as a name of the target group, or a dedicated ID of the target group, and the like. The indication information may also include a device address. For example, the indication information of the first terminal device includes a device address of the first terminal device. The indication information of other terminal devices includes respective device addresses of the other terminal devices. The first terminal device knows in advance the device addresses of all the terminal devices belonging to the target group, and thus may determine whether the terminal device belongs to the target group based on the device address in the indication information.

If the data information related to a target group is received, it may be determined that a target group has been established, and the process proceeds to step S110; otherwise, it may be determined that no target group is established, and the process proceeds to step S106.

If no target group is established (the determination result of step S104 is "NO"), the first terminal device establishes a target group in step S106.

Figure 2:
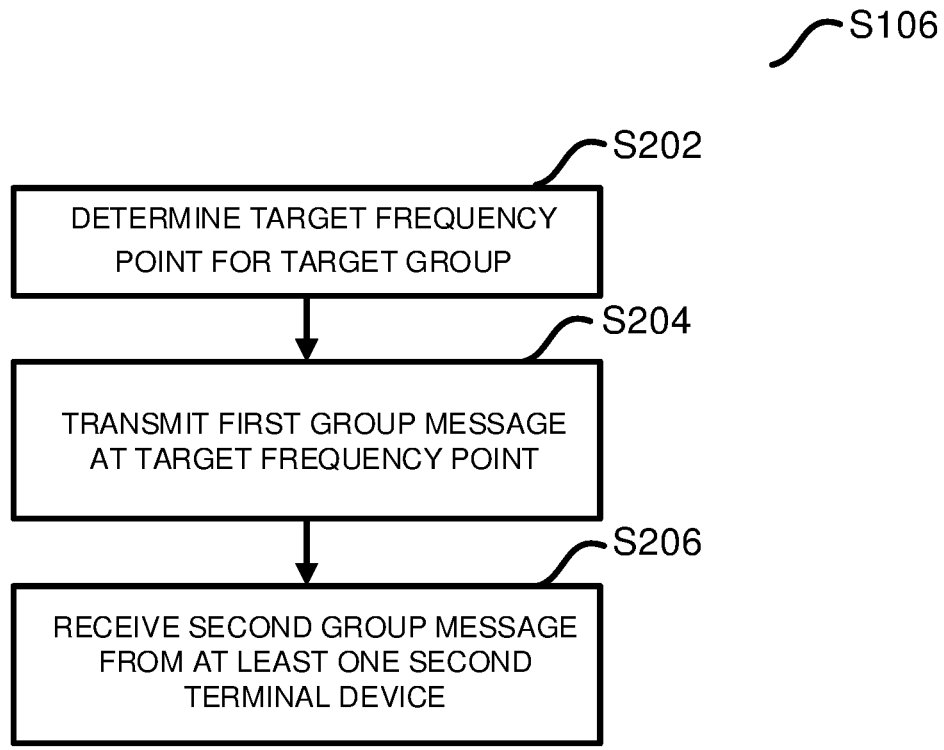
FIG. 2 is an exemplary flowchart of a process of establishing a target group in the embodiment as shown in FIG. 1.

FIG. 2 shows an exemplary flow of a process S106 of establishing a target group. However, the present disclosure is not limited to the process of establishing a target group as shown in FIG. 2.

As shown in FIG. 2, in step S202, the first terminal device determines a target frequency point for the target group. In this step, one of the plurality of predetermined frequency points that is not occupied may be determined as the target frequency point. For example, a plurality of frequency points are sequentially monitored as candidate target frequency points in a predetermined order. If the first terminal device does not receive any message at some candidate target frequency point within a predetermined time, it shows that the candidate target frequency point is not occupied. Therefore, the candidate target frequency point may be used as the target frequency point.

In step S204, a first group message is transmitted at the target frequency point. The first group message includes indication information and a first parameter. As indicated above, the indication information is related to the target group. The first parameter is related to a first transmission time slot. The first parameter is e.g. a random number. The random number may be obtained by performing a remainder operation on a digital signal generated by an Analog-to-Digital sampling module (AD) on the first terminal device, or by other means. For example, the first terminal device may transmit the first group message by transmitting a broadcast frame periodically, e.g., every other 10 ms, with a broadcast time of e.g. 80 ms. At other times than the broadcast time, other terminal devices may receive broadcast information (the broadcast is continuous and random, and air collision will not always occur), and thus the other terminal devices may determine their own transmission time slots in the target group.

At step S206, a second group message from at least one second terminal device is received. The second terminal device represents a terminal device different from the first terminal device. The second group message includes the indication information as described above and a second parameter. The second parameter is related to each of second transmission time slots for the at least one second terminal device. Likewise, the second parameter is, e.g., a random number. The random number may be obtained by performing the remainder operation on a digital signal generated by an Analog-to-Digital sampling module (AD) on the second terminal device, or by other means. The second transmission time slot represents a transmission time slot different from the first transmission time slot. In a case where there is more than one second terminal device, for the respective second terminal devices, the second parameters in the second group messages are different, and the second transmission time slots for the respective second terminal devices are different transmission time slots.

After receiving the second group message from the at least one second terminal device, the target group is established.

Referring to FIG. 1, in step S108, the first terminal device determines a first transmission time slot for itself from a plurality of transmission time slots for the target group.

Figure 3:
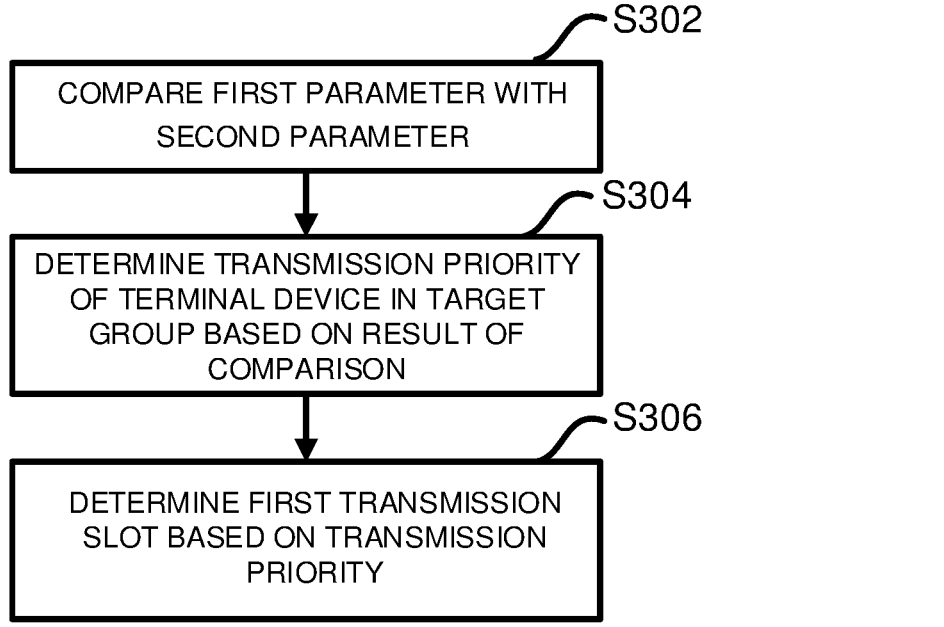
FIG. 3 is an exemplary flowchart of a process of determining a first transmission time slot in the embodiment as shown in FIG. 1.

FIG. 3 shows an exemplary flowchart of a process S108 of determining the first transmission time slot. However, the present disclosure is not limited to the process of determining the first transmission time slot as shown in FIG. 3.

Hereinafter, the second group messages from three second terminal devices (A, B, C) being received in step S206 of FIG. 2 is explained as an example. The second parameter in the second group message from the second terminal device A is, e.g., 5, the second parameter in the second group message from the second terminal device B is, e.g., 80, and the second parameter in the second group message from the second terminal device C is, e.g., 17. Furthermore, the first parameter in the first group message transmitted by the first terminal device is, e.g., 13.

In step S302, the first terminal device compares sizes of the first parameter and the second parameter. In this example, the first parameter and these three second parameters are sequentially arranged in an ascending order: the second parameter 5 corresponding to the second terminal device A, the first parameter 13, the second parameter 17 corresponding to the second terminal device C, and the second parameter 80 corresponding to the second terminal device B.

In step S304, based on the result of the comparison, the first terminal device determines its transmission priority in the target group. For example, based on a rule that the smaller the parameter is, the higher the transmission priority is, the transmission priority of the second terminal device A may be determined to be 1, the transmission priority of the first terminal device may be determined to be 2, the transmission priority of the second terminal device C may be determined to be 3, and the transmission priority of the second terminal device B may be determined to be 4. Alternatively, the transmission priority of the first terminal device may also be determined based on a rule that the larger the parameter is, the higher the transmission priority is. However, the present disclosure is not limited thereto, and other rules may also be used to determine the transmission priority of the terminal device.

In step S306, based on the transmission priority, the first terminal device determines the first transmission time slot. In this example, since the transmission priority of the first terminal device is 2, the first transmission time slot for the first terminal device is a slot with a series number 2 in all slots for the entire target group. Alternatively, other one-to-one mapping relationships between the transmission priorities and the respective transmission time slots may also be used to determine the first transmission time slot based on the transmission priority.

Referring to FIG. 1, after the first transmission time slot is determined in step S108, the process proceeds to step S114. In step S114, the first terminal device transmits a data message in the first transmission time slot. As described above, the data message may include the indication information related to the target group. In addition, the data message may also include communication data, such as voice data or text data, collected by the terminal device.

Here, the communication data may be compressed data. In a case where the communication data is the voice data, e.g., a G.711 audio encoding method or other audio encoding methods may be used to compress original voice data to compressed data with an audio encoding rate of, e.g., 64 Kbps. In a case where the communication data is the text data, a common encoding method, such as Huffman coding, may be used to compress the original voice data.

If the target group has been established (the determination result in step S104 is "YES"), the first terminal device joins the target group in step S110.

Figure 4:
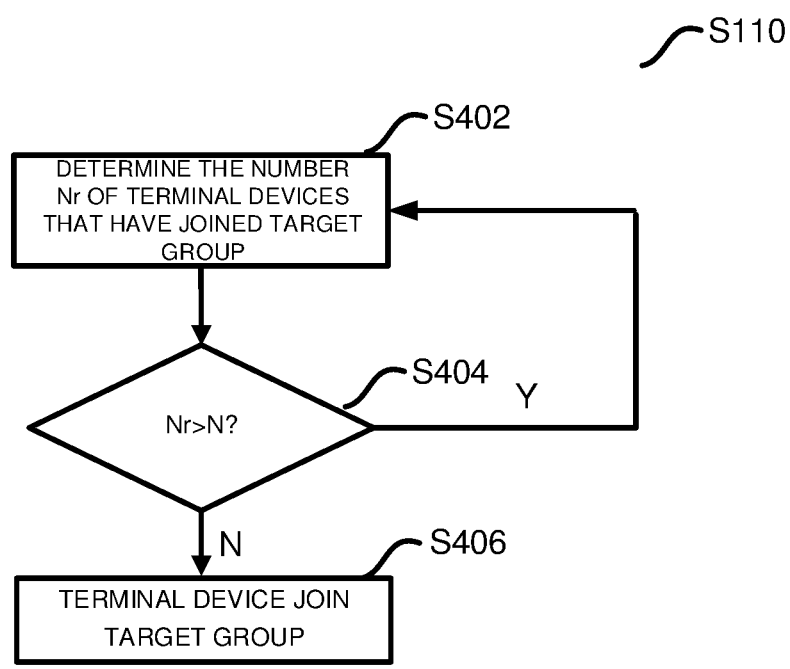
FIG. 4 is an exemplary flowchart of a process of joining a target group in the embodiment as shown in FIG. 1.

FIG. 4 shows an exemplary flowchart of a process S110 of joining the target group. However, the present disclosure is not limited to the process of joining the target group as shown in FIG. 4.

As shown in FIG. 4, in step S402, the first terminal device determines that there are Nr terminal devices that have joined the target group. In an embodiment of the present disclosure, when a terminal device joins the target group, the terminal device needs to transmit the data message in a transmission time slot dedicated to the terminal device, no matter whether it needs to transmit communication data, so that other terminal devices know that the terminal device has already joined the target group. If the terminal device does not need to transmit communication data, it transmits a data message in which communication data is empty (e.g., a data message having only a header field) in the transmission time slot dedicated to the terminal device. Therefore, the data message may be monitored at the target frequency point for the target group established in step S104. The number of transmission time slots that are occupied by the data message is the number Nr of terminal devices that have joined the target group.

In step S404, the first terminal device determines whether the number Nr of terminal devices that have joined the target group exceeds the number N of terminal devices that can be accommodated by the target group. In an embodiment of the present disclosure, the number N of terminal devices that can be accommodated by the target group is calculated as:

$$N = \frac{T_s}{\frac{d}{c} + \frac{b_A * T_s}{b_P}} \quad (1)$$

Here, Ts represents a length of the plurality of transmission time slots for the target group (which is equivalent to a time period between two first transmission time slots), d represents a communication distance between the terminal devices in the target group, c represents a speed of light, $b_A$ represents a data encoding rate, and $b_P$ represents a data transmission rate.

In one example, Ts is 4 ms, d is 500 m, c is $3\times10^8$ m/s, $b_A$ is 64 Kbps, $b_P$ is a data transmission rate of a chip operating in the 2.4 GHz frequency band at the physical layer. In some embodiments, $b_P$ may adopt a commonly used 1 Mbps. Since d/c=1.67 μs, which is much smaller than $b_A*T_s/b_P$=256 μs, only $b_A*T_s/b_P$ may be used to represent the transmission time of the data message. Since the transmission time (256 μs) of the data message is much smaller than the time period (4 ms) between the two first transmission time slots, although the data message is not transmitted in consecutive slots, the terminal device which receives the data message may still have sufficient time to decode the compressed communication data, thereby maintaining the consistency of the decoded communication data.

In this example, a theoretical value 15 of N may be obtained by Equation (1). If a higher physical layer data transmission rate and a more efficient audio compression encoding method are adopted, communication of a larger number of terminal devices may be supported in one group. Of course, considering that there must be a certain secure time interval between actual transmission time slots in practice, the actual data message also includes other information, there may be delay in the signal transmission and a buffer pressure of audio data, and other factors, the number of terminal devices supported in one group may be, e.g., 8 or less.

If the number Nr of terminal devices that have joined the target group does not exceed the number of terminal devices that can be accommodated by the target group (the determination result of step S404 is "NO"), the first terminal device may join the target group in step S406.

If the number Nr of terminal devices that have joined the target group exceeds the number of terminal devices that can be accommodated by the target group (the determination result of step S404 is "YES"), the first terminal device may wait for a period of time or directly return to step S402.

Referring to FIG. 1, in step S112, the first terminal device determines, from the plurality of transmission time slots for the target group, the first transmission time slot for the first terminal device.

Figure 5:
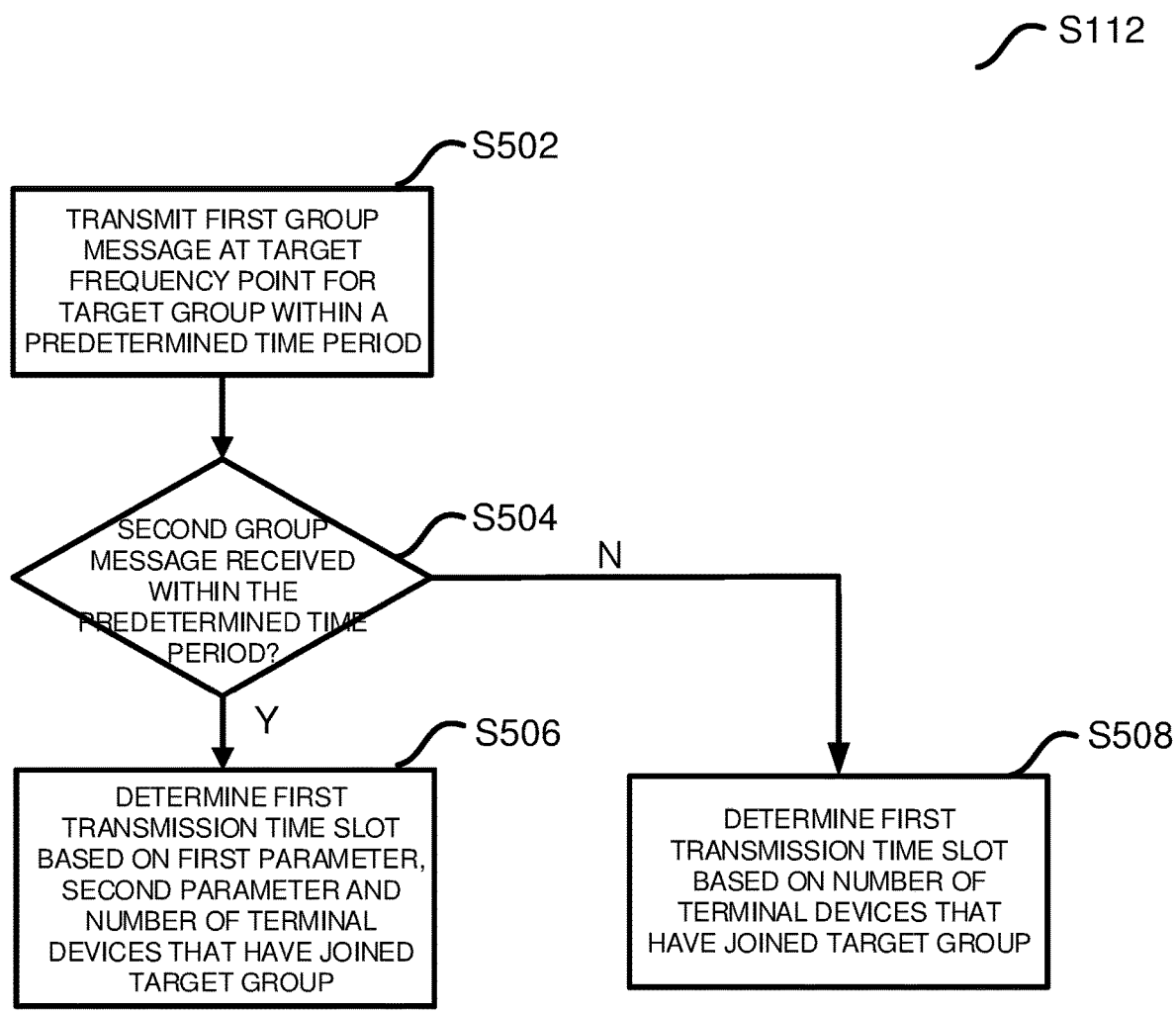
FIG. 5 is an exemplary flowchart of a process of determining a first transmission time slot in the embodiment as shown in FIG. 1.

FIG. 5 shows an exemplary flow chart of a process S112 of determining the first transmission time slot.

As shown in FIG. 5, in step S502, the first terminal device transmits the first group message at the target frequency point for the target group within a predetermined time period. As described above, the first group message includes the indication information and the first parameter. The indication information is related to the target group. The first parameter is related to the first transmission time slot.

In step S504, the first terminal device determines whether a second group message from at least one second terminal device is received within the predetermined time period.

If the first terminal device receives the second group message from the at least one second terminal device within the predetermined time period (the determination result in step S504 is "YES"), it shows that there are other terminal devices ready to join the target group within the predetermined time period. Since the terminal devices that have joined the target group have already determined their respective transmission time slots, the first terminal device may use the method introduced in step S108 as described in connection with FIG. 3 to determine the first transmission time slot according to the first parameter and the second parameter at the unoccupied transmission time slot in step S506. However, the present disclosure is not limited thereto.

If the first terminal device has not received the second group message within the predetermined time period (the determination result in step S504 is "NO"), it shows that no other terminal device is ready to join the target group within the predetermined time period. Therefore, in step S508, the first terminal device may determine the slot immediately adjacent to the last occupied transmission time slot as the first transmission time slot.

Then, referring to FIG. 1, in step S114, the first terminal device transmits the data message in the first transmission time slot.

Figure 6:
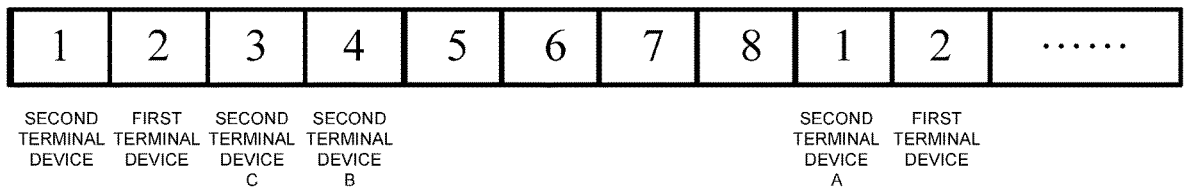
FIG. 6 is an exemplary operation principle diagram of time division multiplexing of terminal devices.

FIG. 6 shows an exemplary operation principle diagram of time division multiplexing of a first terminal device and three second terminal devices. For example, the number N of terminal devices that can be accommodated by the target group is 8. Therefore, the number of transmission time slots for the target group is 8. The transmission priority of the second terminal device A is 1, so it transmits the data message in the transmission time slot with the series number 1. The transmission priority of the first terminal device is 2, so it transmits the data message in the transmission time slot with the series number 2. The transmission priority of the second terminal device C is 3, so it transmits the data message in the transmission time slot with the series number 3. The transmission priority of the second terminal device B is 4, so it transmits the data message in the transmission time slot with the series number 4. Other transmission time slots are not occupied, but the first terminal device and the second terminal device still need to wait to transmit the data messages until in their respective transmission time slots.

As described above, the communication method 100 may avoid collision of the messages transmitted by different terminal devices, thereby implementing the full-duplex wireless communication.

Moreover, some of the steps in the communication method 100 may also be accomplished by a device connected to the first terminal device. For example, the device monitors the plurality of predetermined frequency points to determine if a target group has been established. If no target group is established, the device establishes a target group, and determines, from the plurality of transmission time slots for the target group, the first transmission time slot for the first terminal device. Then, the device notifies the first terminal device of the information related to the target group and the first transmission time slot. If the target group has been established, the device notifies the first terminal device of joining the target group. The device may determine, from the plurality of transmit slots for the target group, the first transmission time slot for the first terminal device. Then, the device notifies the first terminal device of the first transmission time slot. Next, the first terminal device transmits the data message in the first transmission time slot.

Since the group communicates at a fixed frequency point, if other communication apparatuses (e.g., communication apparatuses using a communication protocol such as Wi-Fi or Bluetooth) also communicate at this frequency point, the communication will be interfered. Therefore, the communication method according to an embodiment of the present disclosure may also provide a frequency hopping function to improve anti-interference.

In an embodiment of the present disclosure, the first terminal device may also determine a master device in the target group. For example, the master device is a terminal device that transmits the data message in a predetermined transmission time slot. In an example, the master device is a terminal device that transmits the data message in a transmission time slot with a series number 1. Other terminal devices become slave devices. The master device may initiate a frequency hopping process.

Figure 7:
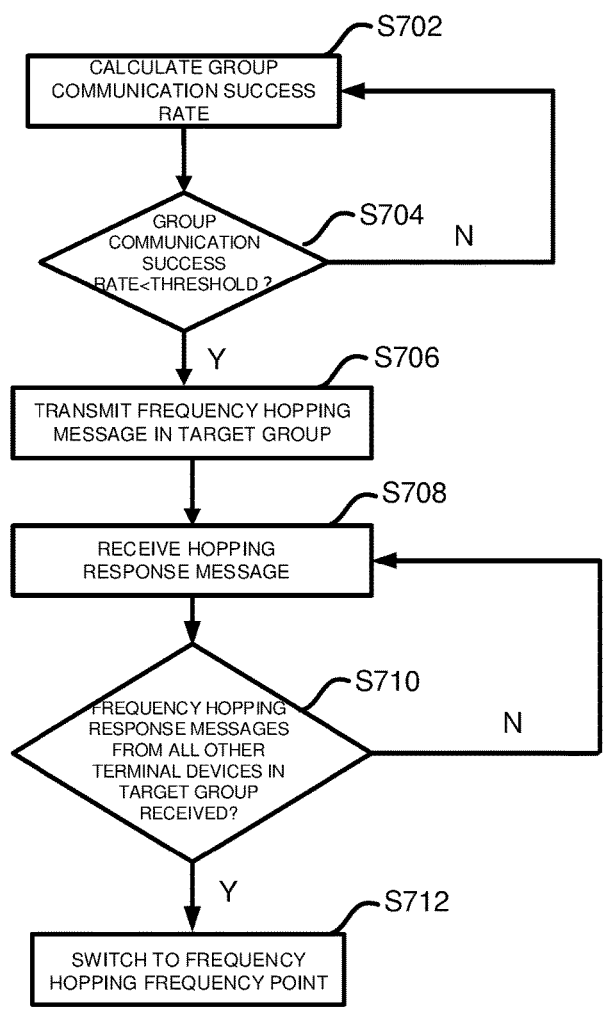
FIG. 7 is an exemplary flowchart of steps further included in a communication method in accordance with an embodiment of the present disclosure.

FIG. 7 shows an exemplary flowchart of a master device initiating a frequency hopping process.

As shown in FIG. 7, in step S702, the master device calculates a group communication success rate based on the data message it transmits and receives in the target group. In this embodiment, the data message may further include a third parameter. The third parameter indicates a number of successful data receptions. Each device in the target group will perform statistics on statuses of receiving data from other devices, and embody it in the number of successful receptions in the frame transmitted by itself. The master device receives a field of the number of successful data receptions of all the slave devices in the target group, and performs statistics and makes a judgment on the current channel communication success rate. For example, the third parameter in the data message transmitted by the first terminal device indicates the amount of data which can be received by the first terminal device successfully from other terminal devices in the first (N−1) (i.e., the number of terminal devices that can be accommodated by the target group minus 1) transmission time slots of the first transmission time slots. The master device calculates the group communication success rate by dividing a sum of the number of successful data receptions of the terminal devices in the target group for e.g. consecutive 20 times by the number of terminal devices in the target group.

At step S704, the master device determines whether the group communication success rate is lower than a threshold. In some embodiments of the present disclosure, the threshold may be, e.g., 80%. However, the present disclosure is not limited thereto.

If the group communication success rate is not lower than the threshold (the determination result of step S704 is "NO"), the target group continues communication at this frequency point.

If the group communication success rate is lower than the threshold (the determination result of step S704 is "YES"), the master device transmits a frequency hopping message to the target group by broadcast on its transmission time slot in step S706. The frequency hopping message may include the indication information and a frequency hopping frequency point. In an embodiment of the present disclosure, the master device may first hop to other candidate target frequency points to determine an unoccupied candidate target frequency point. Then, the master device hops back to the current target frequency point, and transmits the frequency hopping message by broadcast in the target group. The frequency hopping message indicates other devices to hop to the determined candidate target frequency point. The master device may randomly select one frequency hopping frequency point, or may use a random number to determine any frequency point other than the upper and lower frequency points of the current channel as the frequency hopping frequency point. If the frequency hopping frequency point is occupied, the group communication success rate will still be lower than the threshold. As such, the master device may resend a new frequency hopping message.

At step S708, the master device receives a hopping response message from the slave device in the target group. The frequency hopping response message indicates that the slave device has received the frequency hopping message from the master device.

At step S710, the master device determines whether the hopping response messages from all the slave devices in the target group are received. If the master device receives the frequency hopping response messages from all the slave devices in the target group (the determination result of step S710 is "YES"), the master device stops transmitting the frequency hopping message and switches to the frequency hopping frequency point in step S712. If the master device does not receive the hopping response messages from all the slave devices in the target group (the determination result in step S710 is "NO"), the process may return to step S708 to continue waiting for the frequency hopping response message, or in other embodiments, may cancel the frequency hopping or directly initiate a new round of frequency hopping.

Figure 8:
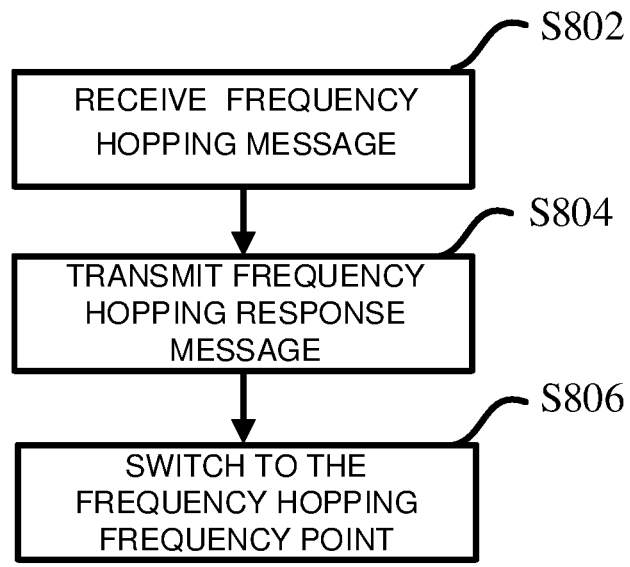
FIG. 8 is an exemplary flowchart of steps further included in a communication method in accordance with an embodiment of the present disclosure.

FIG. 8 shows an exemplary flowchart of a process of a slave device responding to a frequency hopping message. However, the present disclosure is not limited to the process of the slave device responding to the frequency hopping message as shown in FIG. 8.

As shown in FIG. 8, in step S802, the slave device receives the frequency hopping message from the master device indicating the frequency hopping frequency point.

At step S804, the slave device transmits a frequency hopping response message on its transmission time slot. The frequency hopping response message may include the indication information. In addition, the frequency hopping response message may also include a frequency hopping result. The frequency hopping result may indicate that the slave device will switch to the frequency hopping frequency point.

In step S806, the slave device switches to the frequency hopping frequency point.

Further, in an embodiment of the present disclosure, the slave device may adjust its own transmission time based on the transmission time slot of the master device. For example, the slave device may re-time the transmission of its data message based on the reception time of the data message from the master device, the transmission time of the data message, and its corresponding transmission time slot. For example, the transmission time $t_c$ of the slave device is calculated as:

$$t_c = t_r - \frac{b_A * T_s}{b_P} - \frac{(M-1) * T_s}{N} \qquad (2)$$

Here, $t_r$ represents the time at which the slave device receives the data message from the master device, $b_A$ represents the data encoding rate, Ts represents the length of the plurality of transmission time slots for the target group, $b_P$ represents the data transmission rate, $b_A*Ts/b_P$ represents the transmission time of the data message, M represents the series number of the transmission time slot corresponding to the slave device, and N represents the number of terminal devices that can be accommodated by the target group.

In an embodiment of the present disclosure, before transmitting the data message, the terminal device may use e.g. two First-In-First-Out queues (double FIFO), in a ping-pong operation mode, or use a large buffer to pre-cache a segment of communication data (e.g., voice data of 4 ms), and then start transmitting the data message. As such, it can be avoided that the collection speed of the communication data cannot keep up with the transmission speed of the data message.

Figure 9:
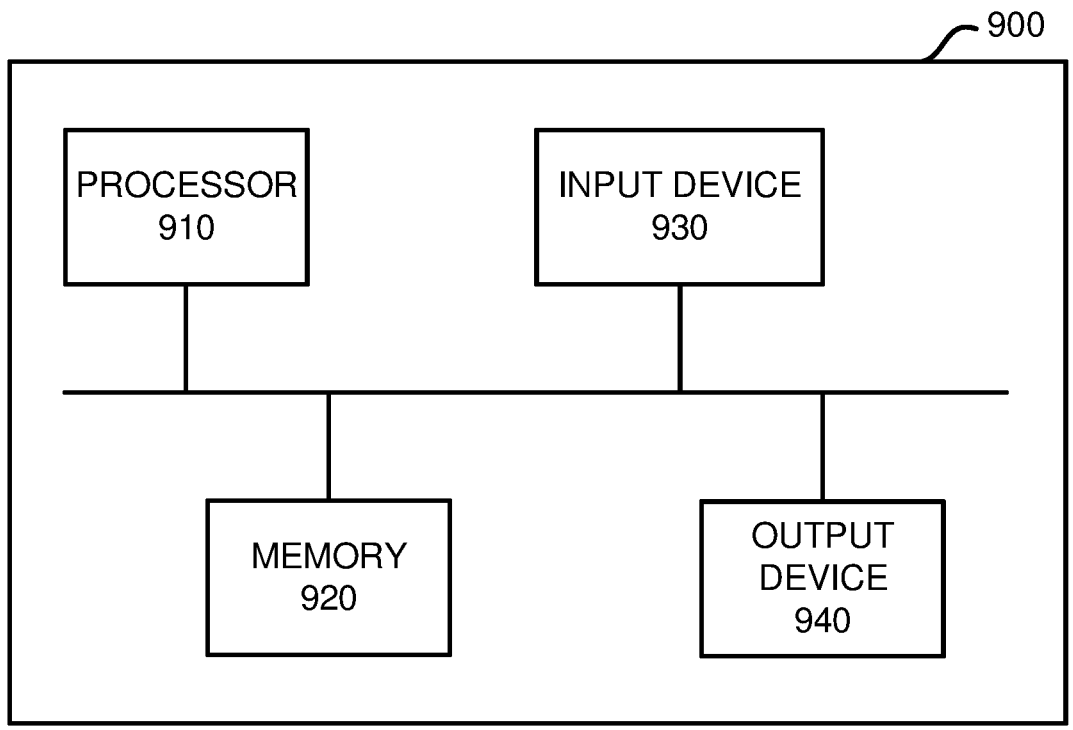
FIG. 9 is a schematic block diagram of a communication apparatus in accordance with an embodiment of the present disclosure.

FIG. 9 shows a schematic block diagram of a communication apparatus 900 in accordance with an embodiment of the present disclosure. As shown in FIG. 9, the communication apparatus 900 may include a processor 910 and a memory 920 that stores computer program. When the computer program is executed by the processor 910, the communication apparatus 900 is caused to perform the steps of the communication method 100 as shown in FIG. 1. In one example, the communication apparatus 900 may be the first terminal device. The communication apparatus 900 may monitor a plurality of predetermined frequency points to determine if a target group has been established. If no target group is established, the communication apparatus 900 establishes a target group, and determines, from the plurality of transmission time slots for the target group, a first transmission time slot for the communication apparatus 900. The communication apparatus 900 then transmits a data message in the first transmission time slot.

Moreover, in this or other embodiments, if the target group has been established, the communication apparatus 900 joins the target group, and determines, from the plurality of transmission time slots for the target group, the first transmission time slot for the communication apparatus 900. The communication apparatus 900 then transmits the data message in the first transmission time slot.

In an embodiment of the present disclosure, the communication apparatus 900 may determine a target frequency point for the target group and transmit a first group message at the target frequency point. The first group message includes indication information and a first parameter. The indication information is related to the target group. The first parameter is related to the first transmission time slot. The communication apparatus 900 then receives a second group message from at least one second terminal device. The second group message includes the indication information and a second parameter. The second parameter is related to each of second transmission time slots for the at least one second terminal device.

In an embodiment of the present disclosure, the communication apparatus 900 may compare the first parameter with the second parameter. Then, the communication apparatus 900 may determine a transmission priority of the communication apparatus 900 in the target group based on the result of the comparison. Next, the communication apparatus 900 may determine the first transmission time slot based on the transmission priority.

In an embodiment of the present disclosure, the communication apparatus 900 may determine whether the number of terminal devices that have joined the target group exceeds the number of terminal devices that can be accommodated in the target group. If the number of terminal devices that have joined the target group does not exceed the number of terminal devices that can be accommodated in the target group, the communication apparatus 900 may join the target group.

In an embodiment of the present disclosure, the communication apparatus 900 may transmit the first group message at the target frequency of the target group within a predetermined time. The first group message includes indication information and a first parameter. The indication information is related to the target group. The first parameter is related to the first transmission time slot. If the second group message from the at least one second terminal device is received within the predetermined time period, the communication apparatus 900 may determine the first transmission time slot according to the first parameter, the second parameter and the number of terminal devices that have joined the target group. The second group message includes the indication information and the second parameter. The second parameter is related to each of second transmission time slots for the at least one second terminal device. If the second group message is not received within the predetermined time period, the communication apparatus 900 may determine the first transmission time slot based on the number of terminal devices that have joined the target group.

In an embodiment of the present disclosure, the communication apparatus 900 may determine a master device in the target group.

In an embodiment of the present disclosure, in a case where the communication apparatus 900 is a master device, the communication apparatus 900 may calculate a group communication success rate based on the data messages transmitted and received in the target group. The data message includes a third parameter. The third parameter indicates a number of successful data receptions. If the group communication success rate is lower than a threshold, the communication apparatus 900 may transmit a frequency hopping message in the target group. The frequency hopping message includes a frequency hopping frequency point. Then, the communication apparatus 900 may receive a frequency hopping response message from a slave device in the target group. If the communication apparatus 900 receives the frequency hopping response message of all the slave devices in the target group, the communication apparatus 900 stops the transmission of the frequency hopping message, and switch to the frequency hopping frequency point.

In an embodiment of the present disclosure, in a case where the communication apparatus 900 is a slave device, the communication apparatus 900 may receive a frequency hopping message from the master device indicating a frequency hopping frequency point. Then, the communication apparatus 900 may transmit a frequency hopping response message and switch to the frequency hopping frequency point.

In an embodiment of the present disclosure, in the case where the communication apparatus 900 is a slave device, the communication apparatus 900 may re-time the transmission of the data message, based on the reception time of the data message from the master device, the transmission time of the data message and the first transmission time slot.

In an embodiment of the present disclosure, the processor 910 may be, e.g., a central processing unit CPU, a microprocessor, a digital signal processor (DSP), a multi-core based processor architecture processor, or the like. The memory 920 may be any type of memory implemented using data storage techniques, including, but not limited to, a random access memory, a read only memory, a semiconductor based memory, a flash memory, a disk storage, and the like.

Moreover, in an embodiment of the present disclosure, the communication apparatus 900 may also include an input device 930, such as a microphone, a keyboard, a mouse, etc., for inputting the communication data. In addition, the communication apparatus 900 can also include an output device 940, such as a microphone, a display, etc., for outputting the communication data from other terminal devices.

Alternatively, the communication apparatus 900 may be a device connected to the first terminal device. For example, the communication apparatus 900 monitors a plurality of predetermined frequency points to determine if a target group has been established. If no target group is established, the communication apparatus 900 establishes a target group, and determines, from the plurality of transmission time slots for the target group, a first transmission time slot for the first terminal device. Then, the communication apparatus 900 notifies the first terminal device of information related to the target group and the first transmission time slot. Next, the first terminal device transmits the data message in the first transmission time slot.

In this or other embodiments, if a target group has been established, the communication apparatus 900 notifies the first terminal device of joining the target group. The communication apparatus 900 may determine, from the plurality of transmission time slots for the target group, the first transmission time slot for the first terminal device. Then, the communication apparatus 900 notifies the first terminal device of the first transmission time slot. Next, the first terminal device transmits the data message in the first transmission time slot.

In other embodiments of the present disclosure, there is also provided a non-transitory computer readable storage medium storing computer program, wherein the computer program, when executed by a processor, implements the steps of the communication method as shown in FIGS. 1 to 5 and 7 to 8.

The embodiments of the present disclosure achieve a higher radio channel utilization and anti-interference capability by a reasonable anti-collision algorithm and protocol design in the 2.4 GHz frequency band, and provide an effective method for achieving the full-duplex voice or data communication between groups (i.e., multiple devices), expanding the application range of the high frequency point carrier communication.

Those skilled in the art will appreciate that the communication method and the communication apparatus in accordance with the embodiments of the present disclosure may also be applied to ISM open high frequency bands above 2.4 GHz.

A singular form of a word used herein and in the claims covers a plural form and vice versa, unless otherwise explicitly stated in the context. Thus, when a singular form of a term is mentioned, it generally covers a plural form thereof. Similarly, the terms "comprising" and "including" are to be construed as inclusive rather than exclusive. Likewise, the terms "include" and "or" are intended to be construed as inclusive, unless otherwise explicitly forbidden in the context. Where the term "example" is used herein, particularly when it is placed after a group of terms, the "example" is merely exemplary and illustrative and should not be considered to be exclusive or broad.

Further aspects and scope of adaptation will become apparent from the description provided herein. It should be understood that various aspects of the present application can be implemented alone or in combination with one or more other aspects. It should also be understood that the description and specific examples are not intended to limit the scope of the present application.

The embodiments of the present disclosure have been described in detail, and it is apparent that various modifications and changes may be made to the embodiments of the present invention without departing from the spirit and scope of the disclosure. The scope of protection of the disclosure is defined by the appended claims.

I claim:

1. A communication method, comprising:
monitoring a plurality of predetermined frequency points to determine whether a target group has been established;
establishing the target group in response to no target group being established;

determining a first transmission time slot for a terminal device from a plurality of transmission tune slots for the target group; and transmitting, by the terminal device, a data message in the first transmission time slot, joining, by the terminal device, the target group in response to the target group being established, wherein the terminal device's joining of the target group in response to the target group being established comprises:

determining whether a number of terminal devices that have joined the target group exceeds a number of terminal devices that can he accommodated in the target group; and joining, by the terminal device, the target group in response to the number of terminal devices that have joined the target group not exceeding the number of terminal devices that can be accommodated in the target group, wherein a number N of terminal devices that can be accommodated by the target group is calculated as:

$$N = \frac{T_s}{\frac{d}{c} + \frac{b_A * T_s}{b_P}}$$

wherein, Ts represents a length of the plurality of transmission time slots for the target group, d represents a communication distance, c represents a speed of light, $b_A$ represents a data encoding rate, and $b_p$ represents a data transmission rate.

2. The communication method according to claim 1, wherein the determining of the first transmission time slot for the terminal device from the plurality of transmission time slots for the target group comprises:

transmitting, at a target frequency point for the target group, a first group message within a predetermined time period, wherein the first group message comprises indication information and a first parameter, wherein the indication information is related to the target group, and the first parameter is related to the first transmission time slot;

in response to receiving the second group message comprising the indication information and a second parameter from at least one second terminal device within the predetermined time period, determining the first transmission time slot based on the first parameter, the second parameter, and the number of terminal devices that have joined the target group, wherein the second parameter is related to each second transmission time slot for the at least one second terminal device; and in response to the second group message not being received within the predetermined time period, determining the first transmission time slot based on the number of terminal devices that have joined the target group.

3. The communication method according to claim 1, wherein the establishing of the target group comprises:

determining a target frequency point for the target group;

transmitting, at the target frequency point, a first group message, wherein the first group message comprises indication information and a first parameter, wherein the indication information is related to the target group, and the first parameter is related to the first transmission time slot; and receiving a second group message from at least one second terminal device, wherein the second group message comprises the indication information and a second parameter, wherein the second parameter is related to each second transmission time slot for the at least one second terminal device.

4. The communication method according to claim 3, wherein the determining of the target frequency point for the target group comprises:

determining one of the plurality of predetermined frequency points that is not occupied as the target frequency point.

5. The communication method according to claim 3, wherein the determining of the first transmission time slot for the terminal device from the plurality of transmission time slots for the target group comprises:

comparing the first parameter with the second parameter;

determining a transmission priority of the terminal device in the target group based on a result of the comparison; and determining the first transmission time slot based on the transmission priority.

6. The communication method according to claim 3, wherein the indication information comprises an identification of the target group.

7. The communication method according to claim 3, wherein the indication information comprises a device address of a terminal device belonging to the target group.

8. The communication method according to claim 3, wherein the first parameter and the second parameter are random numbers.

9. The communication method according to claim 1, further comprising:

determining a master device in the target group.

10. The communication method according to claim 9, further comprising:

in response to determining that the master device is the terminal device, calculating, by the terminal device, a group communication success rate based on data messages transmitted and received in the target group, wherein each of the data messages comprises a third parameter indicating a number of successful data receptions;

in response to the group communication success rate being lower than a threshold, transmitting, by the terminal device, a frequency hopping message in the target group, wherein the frequency hopping message comprises a frequency hopping frequency point;

receiving, by the terminal device, frequency hopping response messages from other terminal devices in the target group; and in response to the terminal device receiving the frequency hopping response messages from all other terminal devices in the target group, stopping transmitting the frequency hopping message, and switching to the frequency hopping frequency point.

11. The communication method according to claim 9, further comprising:

in response to determining that the master device is not the terminal device, receiving, by the terminal device, a frequency hopping message from the master device indicating a frequency hopping frequency point;

transmitting, by the terminal device, a frequency hopping response message; and switching the terminal device to the frequency hopping frequency point.

12. The communication method according to claim 9, further comprising:

in response to determining that the master device is not the terminal device, re-timing, by the terminal device, transmission of the data message, based on a reception time of a data message from the master device, a transmission time of the data message, and the first transmission time slot.

13. A communication apparatus, comprising:

at least one processor; and at least one memory storing computer program, wherein when the computer program is executed by the at least one processor, the communication apparatus is caused to perform the steps of the communication method according to claim 1.

14. A non-transitory computer readable storage medium storing a computer program, wherein the computer program, when executed by a processor, causes the processor to perform the steps of the communication method according to claim 1.

* * * * *